Oct. 31, 1967

R. J. GOETZ 3,349,657

THIN FILM STRIP LINE FABRICATION

Filed Feb. 4, 1964

2 Sheets-Sheet 1

INVENTOR.
RAYMOND J. GOETZ

BY Wade Koontz and Sherman H. Goldman
ATTORNEYS

INVENTOR.
RAYMOND J. GOETZ
BY Wade Koontz
Sherman H. Goldman
ATTORNEYS

United States Patent Office 3,349,657
Patented Oct. 31, 1967

3,349,657

THIN FILM STRIP LINE FABRICATION

Raymond J. Goetz, Baltimore, Md., assignor to the United States of America as represented by the Secretary of the Air Force Filed Feb. 4, 1964, Ser. No. 342,578
2 Claims. (Cl. 83—5)

ABSTRACT OF THE DISCLOSURE

An apparatus for the manufacture of thin film strip lines on a metallic coated substrate which has a means for clamping the substrate with a guide slot oriented in a predetermined pattern in the clamp, and a cutting tool having a head portion formed with a 90° edge with slots therein such that the cutting tool may be drawn in the guide slot on the clamping means for removing undesired metal on the substrate, thereby leaving the desired strip lines.

This invention relates generally to narrow, thin film strip line fabrication and, more particularly, to a method and apparatus for forming fine lines of conductor material on a dielectric substrate.

Previously, when thin film strips were formed on a dielectric material, vacuum deposition was utilized in conjunction with masks having the desired pattern to be reproduced on the dielectric. This type of system causes considerable difficulty where very fine lines were required in that the lack of substantial mask material between the slots forming the lines encourages mask bucklings, thereby giving an uneven set of lines which require further processing in order to render them useful. In addition, dust or dirt may cause a buckling of the mask, and if it is caught in an end of a slit of a mask, it becomes coated with metal, and protrudes above the mask. Removal of the mask often causes the scrapping off of a part of the conductor. The type of edges of the lines procured by the prior art methods were not square to the extent that they could be used in cryogenic, superconducting applications.

An alternative method, previously utilized, required the removal of a coating to form the desired line pattern, vacuum depositing over the coated and uncoated portion of the substrate and, finally, removing the remaining coating with the material vacuum deposited thereon. In addition to being expensive and time consuming, this method does not produce strip lines suitable for cryogenic applications.

Accordingly, it is a primary object of this invention to provide a novel method and apparatus for the vacuum deposition of thin film strip lines.

It is another object of this invention to provide a method and apparatus for the production of thin film strip lines which decreases fabrication time.

It is still another object of this invention to provide a method and apparatus for thin film strip lines whereby square ends and edges are provided along the length of the line in order to render the lines suitable for use as cryotrons in cryogenic applications.

It is a further object of this invention to provide a method and apparatus for thin film strip lines whereby the apparatus can be utilized to make bends in the lines and allows for the utilization of the lines as resistors, conductors, transformers, antenna loops and inductors.

It is a still further object of this invention to provide a method and apparatus for thin film strip lines which may be utilized in mask preparation to provide a positive, thereby eliminating drawing and photographic time.

It is still another object of this invention to provide an apparatus for thin film strip lines which are easily manufactured of conventional, currently available materials that lend themselves to mass production manufacturing techniques.

These and other advantages, features and objects of the invention will become more apparent from the following description taken in connection with the illustrative embodiments in the accompanying drawings, wherein.

Figure 1:
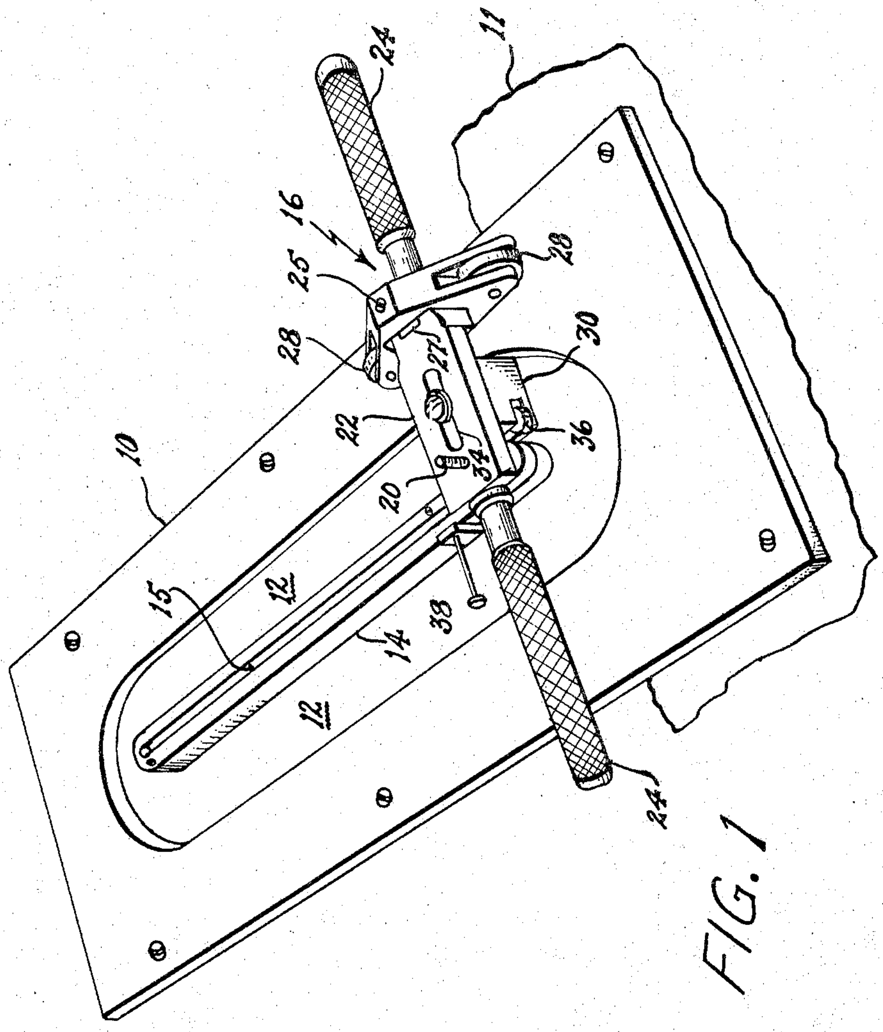
FIGURE 1 is a perspective view of the tool utilized in forming strip lines in conjunction with a guiding mechanism.

Referring to FIGURE 1, there is shown a guide plate 10 which is clamped or otherwise secured to a table or support 11 by any conventional means. The guide plate 10 may overlie the substrate 12 and served to clamp it to the support. In the embodiment shown in FIGURE 1, a cutout portion in the plate 10 forms a trough at the bottom of which the substrate 12 may be seen. The substrate 12 may be of Mylar or Teflon, and where only longitudinal lines are to be formed, the guide mechanism may be arranged such that the Mylar or Teflon substrate is drawn beneath the guide plate and the cutting tool 16 and guided by an appropriate slot in the guide plate. A central island 14, also clamped to the support 11, is located within the trough and forms one part of the guide for the cutting tool 16. A longitudinal slot 15 extends along the length of the island 14 and is arranged for engagement with an adjustable pin 20 (FIGURES 1 and 2) which is threadably secured into the body 22 of the cutting tool 16.

A pair of handles 24 extend from the body 22 and may be used for hand operation of the device, be adapted for a power drive or be clamped when the substrate material is moved. The end of the body 22 remote from the pin 20 contains a yoke 26 which is adjustably mounted for vertical movement by means of a machine screw 25 extending into the body 22 with shims or spacer washers 27 between the yoke 26 and body 22. Thus, the tool may be adjusted to be horizontal at various heights above the substrate material 12. A pair of rollers 28 are arranged at the ends of the bifurcated yoke 26 in order to ride on the guide plate 10. An horizontal adjustment may be made by the attachment of the cutting edge 30 to the body 22 by means of a screw 32 which extends through a slot 34 in the body 22. If desired, a roller or rollers 36 may be provided in the cutting edge mount to abut against the side wall portions of the island 14. Any convenient stop means, such as that illustrated at 38, may be provided for mounting either on the island, as shown, or alternatively, from the guide plate.

To fabricate a thin film strip line with the afore-described apparatus one must first place the substrate material 12 within a conventional vacuum deposition apparatus in order completely to coat the surface or surfaces upon which the lines are to be fabricated. The next step involves the placement of the substrate on a guiding mechanism apparatus in order that the cutting tool may be raked across the substrate to cause a removal of the deposited material, such as lead, in a desired pattern arrangement.

Figure 2:
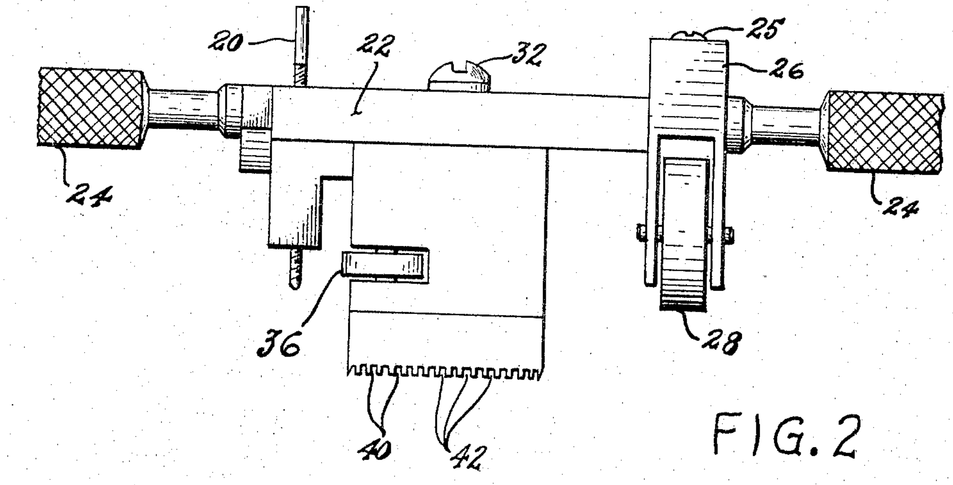
FIGURE 2 is a view in elevation of the tool of this invention.
Figure 3:
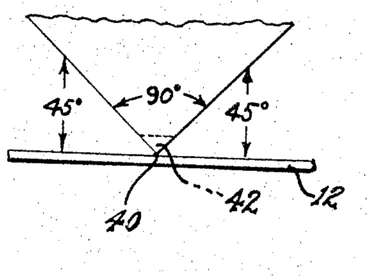
FIGURE 3 is a schematic representation of the cutting portion of the tool in relation to the substrate material.

The cutting edge 30 more clearly depicted in FIGURES 2 and 3, has a lateral edge 40 oriented, as shown, with respect to the substrate 12 with slots 42 cut in the edge thereof to provide the lines at a predetermined spacing.

With the apparatus shown in FIGURE 1, the substrate would be clamped by the guide plate 10 and the island 14. The path of the lines would then follow the shape of the trough. The particular guide means utilized may be arranged to form any predetermined path for the strip lines.

Figure 4:
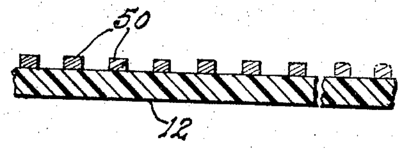
FIGURE 4 is a schematic representation of the lines formed by the tool of FIGURES 1 and 2 as compared with those formed by prior art methods.

By utilization of the cutting tool 16 with a desired guide mechanism it had been found that the raking action of the cutting edge 30 produce strip lines 50 that have its edges or surfaces each in an othrogonal relationship to its adjacent one, as shown in FIGURE 4. A slight rounding of the edges as shown in dotted lines in FIGURE 4 is typical of the product of previously utilized processes. It should be noted that the guide mechanism shown in FIGURE 1 may be utilized for straight lines only if the substrate material does not extend around the curved end portions of the trough, thereby allowing a raking action only adjacent the straight portion of the island.

The device has been constructed with the cutting edge 30 containing about 56 teeth with the edge slots cut in to a depth of $\frac{1}{16}$ of an inch by using a screw slot saw on a milling machine. The slots were .008 inch wide with .010 inch spacing.

Although the invention has been described with reference to a particular embodiment, it will be understood to those skilled in the art that the invention is capable of a variety of alternative embodiments in accordance with any desired resultant shape of the strip lines. I intend to be limited only by the spirit and scope of the appended claims.

I claim:

1. An apparatus for use in the manufacture of thin film strip lines on a metallic coated substrate comprising, means for clamping said substrate, said means for clamping having a guide slot therein oriented in a predetermined pattern, and a cutting tool, said cutting tool comprising a body portion, a cuting head adjustably secured to said body portion for horizontal positioning therealong, said cutting head being formed of a 90° edge with slots therein, the slots corresponding to the width of the strip lines, a pin mounted for vertical adjustment in said body adjacent one end of said body, said pin being adapted to engage said guide slot, and vertically adjustable means for engagement with said guide plate, said last-mentioned means being mounted on said body adjacent its other end.

2. An apparatus as defined in claim 1 including means attached to said ends of said body for applying power to move said cutting tool.

References Cited

UNITED STATES PATENTS

| | | | |
|---|---|---|---|
| 611,238 | 9/1898 | Drinkaus | 83—9 |
| 1,218,898 | 3/1917 | Fougere | 83—5 X |
| 2,986,815 | 6/1961 | Fernald et al. | 30—304 |

FOREIGN PATENTS

| | | |
|---|---|---|
| 1,018,887 | 12/1952 | France. |

JAMES M. MEISTER, *Primary Examiner.*